May 6, 1952         D. E. NORGAARD         2,595,876

RADIO PULSE-ECHO LOCATING EQUIPMENT

Filed Feb. 2, 1944         3 Sheets-Sheet 2

Fig.1b.

Inventor:
Donald E. Norgaard,
by Harry E. Dunham
His Attorney.

Patented May 6, 1952

2,595,876

UNITED STATES PATENT OFFICE 2,595,876

RADIO PULSE-ECHO LOCATING EQUIPMENT

Donald E. Norgaard, Scotia, N. Y., assignor to General Electric Company, a corporation of New York Application February 2, 1944, Serial No. 520,724

20 Claims. (Cl. 343—7)

The present invention relates to locating equipment of the type utilizing echoes of periodic pulses of wave energy from a remote object to determine its location. In such equipment the transmitted pulse rate is usually chosen so that the echoes from objects within the desired range arrive during the intervals between succeeding pulses. Echoes from objects beyond this range will arrive after the transmission of a succeeding pulse and accordingly make possible an ambiguous representation.

An object of my invention is to provide an improved equipment in which echoes from beyond the range being investigated do not interfere with the measurement, presentation, or tracking of the position of a target.

A further object of my invention is to provide an improved automatic range tracking circuit.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which Figs. 1a and 1b when placed side by side form a diagram of equipment embodying my invention.

Figure 1A:
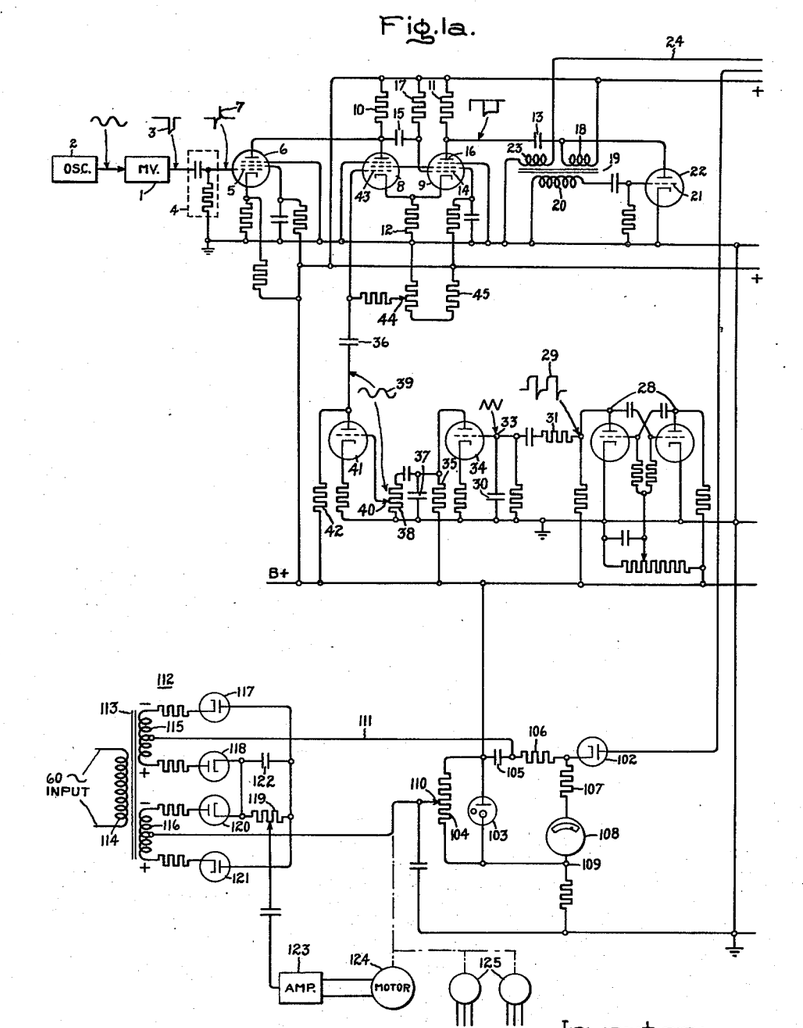

Referring to the drawings, in the upper section of Fig. 1a there is shown the pulse frequency control which comprises a multivibrator 1 controlled by an oscillator 2 so as to have negative output pulses, indicated at 3, at the desired uniform repetition rate or pulse frequency which may be such that echoes or reflections from more remote objects may be received prior to the transmission of a succeeding pulse of radio waves. The negative output pulse of the pulse frequency multivibrator is fed through a differentiation circuit 4 to the grid 5 of a device 6, which is biased on by the positive peaks 7 coincident with the trailing edge of the pulse frequency multivibrator output to trigger a delay multivibrator comprising devices 8 and 9 connected across the power supply through plate resistors 10 and 11 and a common cathode resistor 12. The device 9 is normally conducting and the device 8 is normally biased off by the current in the cathode resistor. When the device 6 is biased on, the voltage drop through the common plate resistor 10 applies a negative swing to the grid 14 of the device 9 through a coupling condenser 15, thus biasing the device 9 to cut-off and causing a sudden increase in potential at its anode 16. The interruption of current through the device 9 removes the negative bias from the device 8, turning the device 8 on and simultaneously creating a further negative swing in the potential on the grid 14, thus driving the device 9 beyond cut-off. The device 9 remains at cut-off for a period determined in part by magnitude of the current through the device 8 and in part by the values of the condenser 15 and resistance 17 which determine the rate at which the condenser 15 charges after being driven negative by the firing of the device 8. After the charging of the condenser 15 the device 9 begins to become conductive, causing a drop in potential at its anode 16 and a rise in potential across the cathode resistor 12 which biases the device 8 toward cut-off. This action continues regeneratively until device 8 is driven beyond cut-off, where it is held until triggered again by the following positive peak 7.

The voltage at the anode 16, namely the output of the delay multivibrator comprising devices 8 and 9, is applied through a small condenser 13 to a winding 18 of a pulse transformer 19 having a winding 20 in which is induced a voltage of opposite sign to that appearing across the winding 18. The voltage induced in the winding 20 corresponds roughly to the slope of the wave appearing on anode 16 and is applied to the grid 21 of a device 22 normally biased to cut-off. The negative induced voltage in the winding 20 occurring at the leading end of the delay output voltage at the anode 16 drives the grid 21 still further negative and accordingly has no effect. At the trailing (negative slope) end of the voltage at the anode 16 a positive voltage is induced in the winding 20 which drives the grid 21 in the positive direction thereby causing a sudden flow of current through the winding 18 thus inducing a further voltage in the winding 20 forcing the grid 21 more positive and causing a cumulative increase in current until the grid voltage reaches a value such that a further increase in grid potential causes insufficient increase in current through the winding 18 to maintain this "runaway" condition. The current in winding 18 then begins to collapse and induces a negative voltage in the winding 20 thereby driving the grid 21 negative and causing a cumulative decrease in the current. The result is a pulse of current in the winding 18 having a width of the order of one microsecond. This current induces a corresponding voltage in a winding 23 indicated at 23a which is applied through a conductor 24 to synchronize a pulse transmitter 25 connected through a well-known form of Transmit-Receive device, or TR box, 26 to a directional antenna 27.

From the above described circuits it is apparent that narrow, or brief, pulses of radio waves are transmitted from the antenna 27 at intervals determined by the output of the pulse frequency multivibrator 1 but that, since the pulses are transmitted at the trailing ends of the output wave of the delay multivibrator 8, 9, it is possible to vary the time of pulse transmission by varying (modulating) the width of the square wave appearing on anode 16 while keeping the average pulse rate constant.

The control of the time phase of the pulse transmission with reference to the output of the pulse frequency multivibrator 1 consists of a multivibrator 28 having a square wave output of a relatively low frequency, such as 100 cycles. The output frequency of the multivibrator is not critical and may be subject to other wide variations. The output of the multivibrator 28, which is indicated at 29, is fed through an integrating circuit comprising a condenser 30 and resistance 31. This integrating circuit changes the square wave output 29 to a triangular wave shape at terminal 33. The voltage at terminal 33 is applied to the control grid of device 34 and the amplified output is fed through a second integration circuit comprising condenser 37 and resistance 35. In this integration circuit the triangular wave shape is converted to a double parabolic wave shape indicated at 39. A controllable fraction of the double parabolic voltage appearing across the resistance 38 is fed through a slider 40 to an amplifier 41 having an output resistance 42 connected by means of coupling condenser 36 to the control grid 43 of the device 8. The grid 43 is also connected through a slider 44 to a voltage divider 45 which determines the average grid bias. The potential at the grid 43 accordingly consists of an average bias on which is superimposed a signal having the double parabolic wave shape indicated at 39. At the positive peaks of the signal on the grid 43 the current through the device 8 is larger and the condenser 15 is driven more negative upon firing of the device 8. This means that a longer time is taken to recharge the condenser 15 and that the trailing end of the output voltage appearing at the anode 16 will occur later. The time phase of the trailing edge of the output voltage at the anode 16 varies directly with the variation in potential of the grid 43. The pulse rate of the transmitter which is synchronized with the trailing end of the output voltage at the anode 16 will accordingly vary in time phase in a manner which can be described as a frequency or phase modulated pulse rate.

Figure 3:
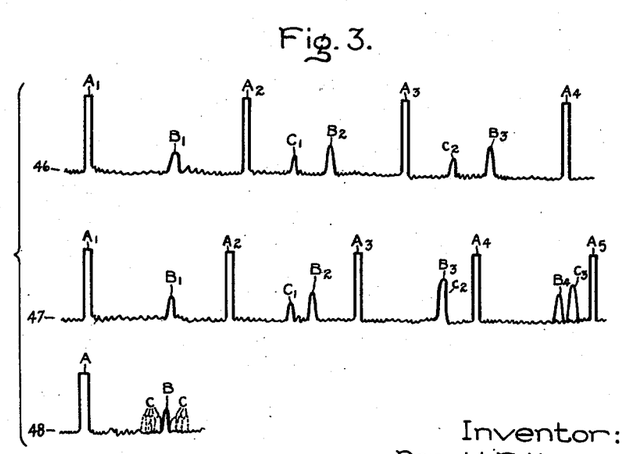

The utility of the frequency or phase modulated pulse rate is illustrated in Fig. 3 where line 46 represents a developed time scale of pulses and echoes with a fixed pulse rate, line 47 represents a developed time scale with a continually increasing pulse rate, and line 48 represents the trace on the viewing screen of a cathode ray tube obtained with the frequency or phase modulated pulse rate. Referring to line 46, A1, A2, A3, and A4 represent successive transmitted pulses, A1 being the first of a series, B1, B2, and B3 represent corresponding echoes of the pulses A1, A2, and A3 from an object close enough to the equipment so that the echoes return before the transmission of a succeeding pulse, and C1, C2 represent echoes of the transmitted pulses A1, A2 from an object so remote from the equipment that the echoes from one pulse do not return to the equipment until after the transmission of a succeeding pulse. Under this condition it is obvious that a fixed pulse rate makes possible an ambiguous representation since the operator might think that the echoes C1, C2 were from an object nearer than the object corresponding to the echoes B1, B2, B3. By continually increasisng the pulse rate as indicated in line 47, the echoes B occur at the same spacing with reference to the transmitted pulses A, but the echoes C continually shift along the time scale. In line 47 the echoes C are represented as occurring first to the left, then coincident with, and then to the right of the echoes B. A similar type of represeentation would be obtained if the pulse rate for line 47 were decreasing instead of increasing. In actual practice the transmitted pulses A and the echoes B would be superimposed on the viewing screen of the cathode ray tube as indicated in line 48, while the echoes C would be scattered on both sides of the echoes B and would be of much lower intensity (as indicated by the dotted lines) than the superimposed pulses and echoes A and B. In practice the echoes C will not be visible. By frequency or phase modulation of the pulse rate the danger of ambiguity due to reflections from objects beyond the desired range of the equipment is eliminated. The frequency modulated pulse rate also eliminates similar interference due to the operation of more than one equipment in the same locality. If such interference develops, it can easily be eliminated by changing the frequency modulation while maintaining the average pulse rate at a constant value.

It is desirable that the frequency modulation be linear so that echoes C will be uniformly spread on either side of the echoes B. This is accomplished by the double parabolic variation of the grid bias of the delay multivibrator and results in triangular frequency modulation. If the frequency modulation is not linear, there is a possibility that the unwanted echoes C will bunch together on the viewing screen and give a false indication.

Figure 1B:
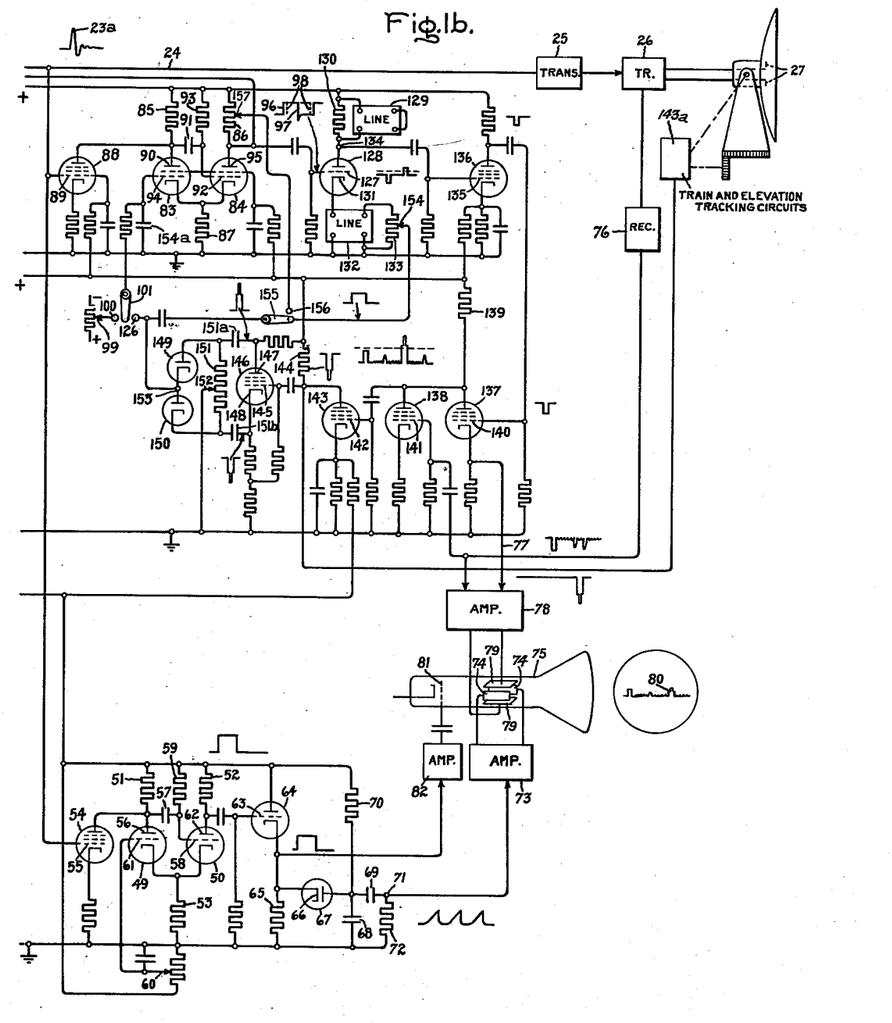

The output pulse 23a of the pulse transformer 19 which synchronizes the pulse transmitter is also fed to a sweep circuit at the lower part of Fig. 1b to generate sawtooth sweep voltages which start synchronously with each transmitted pulse and increase linearly for that part of the interval between the transmitted pulses corresponding to the range investigated by the equipment. The generation of the sweep voltage is controlled by a sweep timing multivibrator comprising devices 49 and 50 having plate resistors 51 and 52 and a common cathode resistor 53. The device 50 is normally conducting and the device 49 is normally biased off by the current flowing in the cathode resistor 53. The multivibrator is keyed by a device 54 connected to the plate resistor 51 and having its control grid 55 biased on by the pulse 23a. The current through the device 54 coincident with the pulse 23a causes a drop in voltage at the anode 56 of the device 49 which is applied through a condenser 57 to the grid 58 of the device 50 biasing the device 50 to cut-off. The interruption of current through the device 50 removes the negative bias from the device 49 which now conducts and causes a negative bias on the device 50 holding it off. The length of time the device 50 remains at cut-off (the delay or sweep interval)

is determined in part by the amount of the current flowing through the device 49 and in part by the values of the condenser 57 and resistance 59. The current through the device 49 may be varied by a potentiometer 60 connected to its control grid 61. The output voltage of the multivibrator appearing at the anode 62 of the device 50 comprises a square wave voltage starting coincident with the pulse 23a and ending at a later time determined by the values of the condenser 57 and the resistance 59 and the adjustment of the potentiometer 60. This output voltage is applied to the grid 63 of a device 64 normally biased off and causes a flow of current through a cathode resistor 65 during the delay (sweep) interval of the multivibrator. The voltage across the cathode resistor 65 is applied to the cathode 66 of a diode 67 connected between the cathode resistor and condensers 68 and 69. During the delay interval of the multivibrator 49, 50 (the sweep interval) the diode 67 is biased off and the condenser 68 charges at a substantially linear rate through a resistance 70 producing a constantly increasing voltage at a terminal 71. At the end of the delay interval of the multivibrator, the voltage across the cathode resistor 65 returns to ground and the condenser 68 discharges through the diode 67 and through resistance 65. As indicated in the diagram adjacent terminal 71, the rate of discharge of the condenser 68 is greater than the rate of charge. The resultant voltage at the terminal 71 is a saw-tooth voltage which starts coincident with the pulse 23a, increases to a maximum at the end of the delay (sweep) interval of the multivibrator 49, 50, and then abruptly decreases. The saw-tooth sweep voltage at the terminal 71 is applied through an amplifier 73 to the horizontal deflection plates 74 of a cathode ray tube 75 producing a horizontal sweep trace on the viewing screen which serves as a time or range scale.

The sweep trace is deflected vertically by the output of a receiver 76 which is fed, together with an aperture pulse from a conductor 77, through an amplifier 78 to the vertical deflection plates 79 of the cathode ray tube. The aperture pulse, hereinafter described, produces a marker 80 on the viewing screen of the cathode ray tube which identifies a particular section of the sweep trace and helps to distinguish the echoes from an object at the range marked by the aperture pulse from other echoes.

The output of the sweep timing multivibrator 49, 50 is fed from the cathode resistor 65 to the grid 81 of the cathode ray tube through an amplifier 82 to actuate the beam of the cathode ray tube during the sweep intervals (and to decrease or blank the beam intensity intermediate the sweep intervals).

The transmitter synchronizing pulse 23a is also used to synchronize a range delay multivibrator comprising devices 83 and 84 connected to plate resistances 85 and 86 and a common cathode resistor 87. The device 84 is normally conducting and the device 83, which is normally biased off by the current in the cathode resistor 87, is triggered on by a device 88 having its control grid 89 connected to the conductor 24 so as to be biased on by the pulse 23a. The flow of current through the device 88 during the pulse 23a produces a negative voltage swing at the anode 90 of the device 83. This negative voltage swing is applied through a condenser 91 to the control grid 92 of the device 84 driving the device 84 off and removing the negative bias on the device 83 which now conducts and creates a further negative voltage on the grid 92 of device 84, holding the device 84 off. The device 83 remains on (and the device 84 remains off) for an interval determined by the time required for the condenser 91 to charge through a resistance 93. This time is determined in part by the values of the condenser 91 and resistance 93 and in part by the magnitude of the current through the device 83. The current through device 83 is controlled by the bias on its control grid 94. At the end of this interval, which may be termed the range delay interval, the device 84 is biased on and the device 83 is biased off. During the range delay interval a square wave output voltage appears at the anode 95 of the device 84 having its leading edge 96 synchronized with the pulse 23a and its trailing edge 97 positioned between the dotted lines 98 at a point determined by the bias on the control grid 94. When the equipment is being manually operated, the bias on the grid 94 (the range delay bias) is obtained from the slider 99 through a contact 100 and a switch 101.

The output of the range delay multivibrator, which consists of a square wave voltage having a duration equal to the percentage of the average interval between transmitted pulses determined by the setting of the slider 99, is fed through a diode 102 to a range bridge in the lower part of Fig. 1a. The range bridge comprises a voltage regulator tube 103 connected across a potentiometer 104 and across a condenser 105 in series with resistances 106 and 107 and an ammeter 108. The voltage regulator tube maintains at terminal 109 a voltage which is greater than the voltage at the anode 95 when the device 84 is conducting. Accordingly no current flows through the diode 102 to the ammeter 108 during the intervals between the range delay intervals. During the range delay intervals the current through the device 84 is interrupted and the voltage at its anode 95 rises approximately to the voltage of the power supply. Current now flows to the ammeter 108 through the diode 102 and resistance 107. At the end of the range delay interval when the voltage at the anode 95 returns to a value less than the voltage at the terminal 109, the current through the ammeter 108 is interrupted. By means of this circuit a constant current flows through the ammeter 108 during the range delay intervals and no current flows through the ammeter during the intervals between the range delay interval. Due to the integrating effect of the ammeter, the ammeter reading will be proportional to the percentage of the range delay interval to the total interval between transmitted pulses. Some question might be raised as to the effect of the frequency modulation of the pulse rate on the accuracy of the range measurement. However, since the pulse frequency is maintained at a constant average rate by the oscillator 2, the effect of frequency modulation of the pulse rate is cancelled by the integrating effect of the ammeter.

In addition to obtaining an ammeter indication of range as a percentage of the average interval between transmitted pulses, the condenser 105 is charged to a voltage proportional to this percentage. Since the maximum voltage to which the condenser 105 can be charged is somewhat less than the voltage across the voltage regulator tube 103, the voltage on the condenser can be balanced by adjusting a slider 110 on the potentiometer 104. For example, if the range delay interval were 100% of the pulse interval, the right hand terminal of the condenser 105 would be at almost the potential of the power supply and the voltage on lead 111 (with respect to voltage at point 109) could be balanced by moving the slider 110 to a point near the top of the potentiometer 104. If the range delay interval were 0% of the pulse interval, the condenser would be charged to the voltage of the voltage regulator tube and the voltage on the lead 111 could be balanced by moving the slider 110 to the bottom of the potentiometer 104. At intermediate range delay intervals, to balance the voltage on lead 111 the slider 110 should occupy a position from the bottom of the potentiometer 104 corresponding to the ratio of the range delay interval to the average interval between transmitted pulses.

The difference between the voltage at the slider 110 and the voltage at the conductor 111, which varies in sign and magnitude with the direction and magnitude of the error in the position of the slider 110 with reference to the position of balance corresponding to the range delay, is converted to an alternating voltage, varying in polarity and magnitude with the direction and magnitude of the error in the position of the slider 110 by means of a modulator 112 comprising a transformer 113 having a primary 114 energized from a suitable (e. g. 60 cycle) A.-C. power supply and having secondary windings 115 and 116 arranged to have induced voltages during alternate half cycles of the signs indicated at the ends of the windings (and to have voltages of opposite sign during intermediate half cycles). During the half cycles when the voltages in the windings 115 and 116 have the indicated signs, current flows in the winding 115 through diodes 117 and 118 and no current flows through the winding 116. During these half cycles the midpoint of the winding 115, which is connected to the conductor 111, and the midpoint of the resistance 119 connected across the diodes 117 and 118 accordingly have the same D.-C. potential which voltage, as explained above, is a function of the range delay interval. During the intermediate half cycles when the voltages in the windings 115 and 116 are of opposite sign, current flows in the winding 116 through diodes 120 and 121 and no current flows in the winding 115. The midpoint of the winding 116, which is connected to the slider 110, has the same D.-C. potential as the midpoint of the resistance 119 when current is flowing through diodes 120 and 121. The condenser 122 is connected across the resistance 119 to prevent simultaneous flow of current from the windings 115 and 116 at the points between the alternate and intermediate half-cycles. From one aspect the modulator can be considered as a pair of bridge circuits having diametral terminals at opposite ends of the resistance 119 and intermediate terminals at the midpoints of the resistance and the windings 115, 116. The voltage at the midpoint of the resistance 119 accordingly shifts at the frequency of the power supplied to the primary 114 from the potential of the conductor 111 to the potential of the slider 110, producing a square wave voltage of the power supply frequency which varies in magnitude and polarity with the error and direction of the displacement of the slider 110 from the position of balance. This square wave voltage is fed through an amplifier 123 to a motor 124 which shifts the slider 110 toward the position in which the voltage on the slider balances the voltage on the conductor 111.

The motor also drives selsyns 125 which transmit the position of the slider 110 to remote points at which this information is to be used. By the operation of the modulator 112, the slider 110 is maintained in a position at which its voltage balances the range delay voltage on the condenser 105 and provides an indication of the range as a percentage of the average interval between transmitted pulses. The modulator circuits are more particularly described and claimed in my copending application Serial No. 36,367, filed July 1, 1948, now Patent 2,471,835, issued May 31, 1949, which is a continuation-in-part of the present application and assigned to the same assignee as the present invention.

In normal use of the equipment, the operator keeps the switch 101 closed on contact 100 until a target is located. The slider 99 is then adjusted to position the aperture pulse (generated in a manner hereinafter described) so it brackets the target echo and the switch 101 is then closed on a contact 126 to bring into operation an automatic tracking circuit which, in a manner to be presently described, automatically adjusts the range delay bias on the grid 94 of the range delay multivibrator to keep the target echo bracketed by the aperture pulse.

The output of the range delay multivibrator 83, 84 is fed to the grid 127 of a device 128 which has an anode in series with a transmission line 129 shunted across a resistance 130 equal to its characteristic impedance and shorted at its remote end and which has a cathode 131 in series with a transmission line 132 shunted at its remote end by a resistance 133 equal to its characteristic impedance. The device 128, which is normally biased off, is biased on at the peaks of the range delay multivibrator output. When the device 128 conducts (at a grid bias indicated by line 157 in line B of Fig. 2) a current flows through the resistance 130 and an equal current starts to flow toward the remote end of the transmission line 129. The current wave flowing down the transmission line 129 reaches the shorted end after an interval determined by the electrical length of the line (e. g., ½ microsecond) and is reflected. When the reflected current wave reaches the resistance 130, the voltage across (and the current through) the resistance 130 drops to zero, and, since the resistance 130 is equal to the characteristic impedance of the transmission line, there are no further reflections. This results in a negative pulse at terminal 134 having a magnitude determined by the characteristic impedance of the transmission line and a width equal to twice the time required for a voltage or current wave to travel from one end of the line to the other. At the end of the range delay interval the bias on the grid 127 is dropped below cut-off, interrupting the current through the device 128 and causing a similar positive pulse at the terminal 134 coincident with the trailing end of the range delay interval. The flow of current through the device 128 during the range delay interval, produces a voltage wave which arrives at the terminating resistance 133 at a later time determined by the length of the transmission line 132. Since the resistance 133 is equal to the characteristic impedance of the transmission line 132, there are no reflections and a voltage appears across the resistance 133 having the delay interval of the range delay multivibrator but displaced in time phase an amount equal to the delay of the transmission line 132. Since the transmission lines 129 and 132 are of substantially the same length, the trailing edge of the voltage appearing at the resistance 133 is at the center of the positive aperture pulse appearing at the terminal 134. From one aspect the voltage appearing at the resistance 133 can be termed a delayed range voltage. The voltage at the terminal 134 is fed to the grid 135 of a clipper 136 which is normally biased off and is biased on only by the positive peaks of the aperture pulses. The output of the clipper, which consists of a negative aperture pulse, is fed to a mixer comprising devices 137 and 138 connected to a common plate resistance 139. The negative aperture pulse is applied to the grid 140 of the device 137. The output of the receiver 76, which includes the transmitted pulses and noise voltages as well as echoes, is applied to the grid 141 of the device 138. The output appearing across the plate resistance 139 consists of the sum of the receiver output voltages and the aperture pulse voltage, as indicated to the left of the plate resistance 139. The aperture pulse alone appears at the conductor 77. The output of the mixer is fed to the grid 142 of a clipper 143 biased so as to draw current only during that part of the mixer output which includes the peak of the aperture pulse. The output of the clipper 143, which includes only the aperture pulse and any coincident echo, appears as a negative voltage across a resistance 144, and is fed to the grid 145 of an inverter 146, causing equal and opposite voltages to appear at the anode 147 and cathode 148. The clipper output consists solely of the aperture pulse and the superimposed echo occurring during the aperture pulse. From one point of view, the aperture pulse can be considered as a gate which is opened to let the coincident echo through. In the mixer and clipper, the echoes bracketed by the aperture pulse are segregated from the other signals. The output of the clipper 143 is also fed to train and elevation tracking circuits 143a which sweep the antenna pointed at the target having an echo bracketed by the aperture pulse.

The voltages at the anode 147 and cathode 148 are fed through series connected diodes 149 and 150. The diodes are shunted by a resistance 151 having a slider 152 connected to ground. Since the voltages applied to the diodes are equal and opposite, it is obvious that the slider 152 can be adjusted to a position such that the potential of the terminal 153 between the diodes will be independent of the amplitudes of the aperture pulse or the received signals. Under this condition, the condensers 151a and 151b maintain an average potential such that the diodes 149, 150 conduct only during the peaks of the aperture pulse. The terminal 153 is connected to a slider 154 on the resistance 133 which applies a desired fraction of the delayed range voltage appearing across the resistance 133. If the range of the aperture pulse were exactly 50% of the average interval between transmitted pulses, the delayed range voltage applied to the terminal 153 would be a symmetrical square wave having its A.-C. axis midway between the positive and negative peaks. During that part of the aperture pulse occurring during the positive peak of the delayed range voltage, less current would flow through the diode 149 and more current would flow through the diode 150. During that part of the aperture pulse occurring during the negative peak of the delayed range voltage, more current would flow through the diode 149 and less current would flow through the diode 150. Because the positive and negative peaks of the delayed range voltage are symmetrical with respect to the A.-C. axis, there would be no change in the average current through the diodes. If the range delay is less than 50% of the average interval between transmitted pulses, the positive peaks of the delayed range voltage will be further displaced from the A.-C. axis than the negative peaks. This means that the average current through the diode 149 will be less because the positive peak is further displaced from the A.-C. axis than the negative peak and the average current through the diode 150 will be greater for the same reason. A decrease in the average current through the diode 149 means that fewer electrons leave its cathode which accordingly is more negative. Similarly, an increase in the average current through the diode 150 means that more electrons arrive at its anode which becomes more negative. The opposite effect would be obtained if the range delay were greater than 50 per cent. The net result is to charge the condenser 154a more negative (or positive if the range delay is greater than 50%), decreasing (or increasing) the range delay bias on the grid 94. The unidirectional voltage at the terminal 153 is thus a linear function of the ratio of the range delay to the average interval between transmitted pulses. It is found that the voltage fed back to the grid 94 by adjusting slider 154 to a suitable position on resistor 133, can be made just short of the amount required to hold the range delay at any position.

Heretofore we have considered the effect of the delayed range voltage and the aperture pulse which is symmetrically positioned with reference to the trailing edge of the range delay voltage, i. e., half of the aperture pulse appears on each side of the trailing edge of the delayed range voltage. Any signal, half of which appeared on either side of the trailing edge of the delayed range voltage would have no effect on the potential of terminal 153 or the resulting bias on the grid 94 since this signal would not change the A.-C. axis of the voltage across the diodes 149 and 150. However, if the signal is displaced to one side of the trailing edge of the delayed range voltage, the terminal 153 is driven in the negative direction if the greater part of the signal is within the delayed range voltage or more positive if the greater part of the signal is outside (beyond the trailing edge of) the delayed range voltage. This can be explained by considering the echo signal and aperture pulse voltage from the inverter 146 as voltages of opposite sign applied to the terminal 153 with the delayed range voltage. This is permissible because the current through the diodes is due to the difference between the delayed range and signal voltages. Part of the signal voltages from the inverter consists of the aperture pulse voltages which are symmetrically (or at least fixedly) positioned with respect to the trailing edge of the delayed range voltage. Since these aperture pulse voltages subtract equal amounts from the voltage at the terminal 153 on opposite sides of the trailing edge of the delayed range voltage, it is apparent that the aperture pulse does not change the bias on the grid 94. If the echo signal were similarly located with reference to the trailing edge of the delayed range voltage, it likewise would have no effect upon the bias of the grid 94. If the echo signal were positioned wholly within the trailing edge of the delayed range voltage, the echo signal would subtract from the positive peak of the delayed range voltage and would tend to lower the unidirectional voltage at the terminal 153. This, in turn, would cause a more negative bias to be applied to the grid 94 and would shorten the range delay of the multivibrator 83, 84, thus moving the trailing edge of the delayed range voltage toward the echo signal. The opposite effect would be obtained if the echo signal were beyond the trailing edge of the delayed range voltage. The action of the range tracking circuit accordingly tends to maintain the echo signal centered with respect to the trailing edge of the delayed range voltage. In order that the range tracking circuit may be stable it is adjusted so that the bias for the grid 94 from the delayed range voltage is just short of the amount required to adjust the delay interval of the multivibrator 83, 84 to coincidence with the range delay. Because of this the echo signal, which is relied upon to supply the additional bias for the grid 94, will not be symmetrically positioned with respect to the trailing edge of the delayed range voltage but will be positioned beyond the trailing edge of the delayed range voltage by an amount necessary to supply the additional bias of the grid 94. This error can be made very small indeed, since only a very small additional bias is required to cause the range delay to adjust itself to follow the signal.

Figure 2:
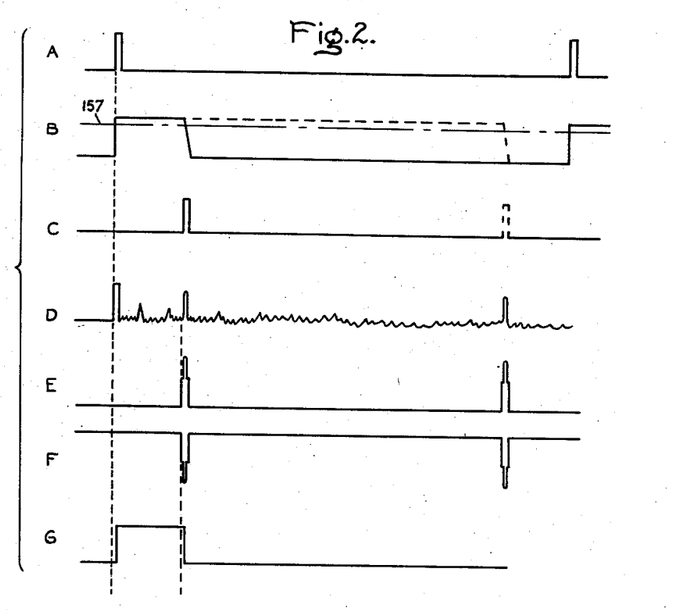
Figs. 2 and 3 are diagrams explaining its operation.

The operation of the automatic range tracking circuit is illustrated in Fig. 2, a series of diagrams on a common scale, in which line A represents the transmitted pulses, line D represents the receiver output which includes the transmitted pulses, echoes from remote objects and noise voltages, line C represents the aperture pulse which is shifted into coincidence with the echo from the target the operator wishes to follow, line B represents the output of the range delay multivibrator 83, 84, and lines E and F represent the output of the inverter 146 which comprises the mixed aperture pulse and target echo. As indicated in line B, the range delay voltage is a square wave voltage having a slightly sloped trailing edge which can be shifted throughout the greater part of the interval between transmitted pulses. The aperture pulse C, being synchronized at the intersection of the line 157 with the range delay voltage, has a definite time phase with respect to the trailing end of the range delay voltage; i. e., it begins as the trailing end of wave B starts. The important feature of the aperture pulse is that it brackets the trailing edge of the delayed range voltage shown in line G. The delayed range voltage is a square wave voltage having leading and trailing edges shifted with respect to the range delay voltage which might more accurately be termed a "delayed range delay voltage." The peak magnitude of the delayed range voltage is less than the peak magnitudes of the inverter output, lines E and F, and in typical equipment may be from $\frac{1}{10}$ to $\frac{1}{30}$ of the peaks of the inverter output.

The delayed range voltage creates a feed-back bias on the grid 94 just short of that required to hold the range delay constant. Because of its time phase, the aperture pulse has a constant effect upon the feed-back bias which is dependent upon the asymmetry of the aperture pulse with respect to the trailing edge of the delayed range voltage. This is due to the fact that in the circuit including the diodes 149, 150, the aperture pulse is mixed in a negative sense with the delayed range voltage to produce a feed-back bias for the grid 94 proportional to the position of the A.-C. axis of the combined voltage. If the aperture pulse were equally spaced on opposite sides of the trailing edge of the delayed range voltage, as represented in lines C and G, equal amounts would be subtracted from the delayed range voltage on opposite sides of its trailing edge and the A.-C. axis of the combined voltage would be unchanged and would be independent of the magnitude of the aperture pulse. If the aperture pulse is not symmetrically located with respect to the trailing edge of the delayed range voltage, it will have a negative (or positive) effect on the A.-C. axis of the combined voltage dependent upon whether the greater part of the aperture pulse is to the left (or right) of the trailing edge of the delayed range voltage. For any particular equipment, the effect of the aperture pulse will be constant and the resultant feed-back bias for the grid 94 can be adjusted so as to be just short of that required to hold the delayed range voltage constant. Since the effect of the delayed range voltage and aperture pulse is constant, the echo which varies with the target range will tend to shift with respect to the trailing edge of the delayed range voltage. The echo voltage, being mixed in the circuit of the diodes 149, 150 in a negative sense with respect to the delayed range voltage, has a negative effect on the feed-back bias of the grid 94 tending to decrease the range delay if the greater part of the echo voltage is to the left of the trailing edge of the delayed range voltage and has an opposite effect if the greater part of the echo voltage is to the right of the trailing edge of the delayed range voltage. The position of the echo voltage with respect to the trailing edge of the delayed range voltage accordingly supplies a range tracking voltage tending to adjust the delay of the multivibrator 83, 84 to correspondence with the range of the target.

Instead of using the delayed range voltage from the slider 154 to supply the greater part of the feed-back bias for the range delay multivibrator 83, 84, it is possible to obtain similar results by utilizing a portion of the range delay voltage appearing in the plate resistor 86. This is accomplished by opening a switch 155 in the lead to the slider 154 and closing the switch on a contact 156 connected to a slider 157 on the plate resistor 86. When the switch 101 is in the automatic tracking position, i. e., closed on the contact 126, a portion of the range delay voltage determined by the setting of the slider 157 is fed to the terminal 153. Because the range delay voltage is taken directly from the plate resistor 86, it has a sloping trailing edge as indicated in line B of Fig. 2 of a width comparable to the width of the aperture pulse. At the terminal 153 the range delay voltage from the slider 157 is roughly equivalent to a square wave voltage such as the wave G which has its trailing edge half way down the slope of the range delay voltage. The voltage from the slider 157 is therefore approximately equivalent to the delayed range voltage from the slider 154 shown in line G of Fig. 2. Since the slope of the trailing edge of the range delay voltage is not easily adjustable, it will in general be more convenient to use the equivalent delayed range voltage shown in line G of Fig. 2, the trailing edge of which can be more easily controlled by varying the electrical length of the transmission line 132.

What I claim as new and desire to secure by Letters Patent of the United States is:

1. In locating equipment of the type wherein recurrent energy pulses are transmitted and the range of remote objects is determined from the time intervals required for corresponding reflected pulses to return therefrom, means for transmitting pulses of wave energy at an instantaneously varying but constant average rate, a range delay multivibrator synchronized by the transmitted pulses and having a delay adjustable to coincidence with reflected pulses from a remote object having a particular range, a bridge circuit including a condenser and a potentiometer for balancing the condenser voltage, means to charge said condenser to a voltage determined by the range delay interval, a modulator for producing an alternating voltage having alternate peaks proportional to said condenser and said potentiometer voltage, and means responsive to said alternating voltage for adjusting said potentiometer in the direction to reduce said voltage whereby the potentiometer adjustment corresponds to the particular range of said remote object as a percentage of the average interval between transmitted pulses.

2. In locating equipment, means for transmitting pulses of wave energy at a variable repetition rate, means for receiving echoes of the transmitted pulses, means for segregating echoes arriving during intervals at a predetermined time delay measured from said transmitted pulses, means generating a square wave voltage having a width varying with said delay and having an edge occurring during said intervals, and means responsive to the time phase of said segregated echoes with respect to said edge of the square wave voltage for adjusting the delay of said segregating means so as to hold said edge in a fixed time phase with respect to said echoes.

3. In locating equipment having means for transmitting pulses of wave energy and means for receiving echoes of the transmitted pulses, a tracking circuit for following a particular target comprising, means for generating a square wave range delay voltage having a width varying with range, means for mixing said range delay voltage with signal voltages occurring during an interval including the time of an edge of said range delay voltage in a manner such that the area of the mixed voltage on one side of its alternating current axis during said interval is affected in opposite sense by signal voltages on opposite sides of said edge, means responsive to the difference between resultant areas preceding and following said edge for varying the width of the range delay voltage in the direction to bring the position of said target echo to coincidence with said edge of the range delay voltage.

4. In a remote object detecting equipment of the type wherein recurrent energy pulses are transmitted and the time interval required for corresponding energy pulses to return from remote objects is measured to determine the distance to such objects, means for transmitting energy pulses at an instantaneously varying but constant average rate, means to produce a delayed range pulse, means to synchronize the initiation of said delayed range pulse with said transmitted pulses, means to adjust the termination of said delayed range pulse to coincidence with pulses received from remote objects having a particular distance, means for receiving pulses from remote objects during an interval including said termination, means for mixing pulses received from remote objects during said interval with said delayed range pulse to produce a resultant voltage having an alternating current axis dependent on the coincidence of the received pulses with respect to said termination, and means utilizing the asymmetry of said resultant voltage with respect to said alternating current axis to vary the delay of said second means in the direction to bring said interval into symmetry with said termination of said delayed range pulse.

5. The method of determining the distance of remote objects from a predetermined point in space, comprising the steps of transmitting successive energy pulses, receiving corresponding energy pulses from said remote objects, visually indicating each of said received pulses in space position corresponding to the time of arrival thereof after the corresponding transmitted pulse, and continuously and cyclically varying the repetition rate of said transmitted pulses in a gradual manner to reduce the effect of interfering received pulses.

6. In locating equipment, means to transmit recurrent energy pulses, means to receive corresponding returned pulses from remote objects, range indicating means synchronized with said transmitting means and responsive to the times of receipt of said corresponding pulses with respect to said transmitted pulses, said indicating means being sensitive to the accumulation of received pulses having substantially equal time delays after the respective transmitted pulses, means to vary the repetition rate of said transmitted pulses uniformly in accordance with a triangular characteristic, and means to maintain said indicating means continuously synchronized with said transmitted pulses during the variations in said repetition rate, thereby to reduce the response of said indicating means to pulses received from remote objects beyond a predetermined distance from said equipment.

7. In high frequency pulse locating equipment, means for transmitting pulses of high frequency energy at a substantially constant average pulse repetition frequency, means for receiving reflected pulses from remote objects, oscillographic indicating means for visually indicating the range of remote objects as a function of the time interval between transmission of a pulse and reception of a corresponding reflected pulse, means for continuously and cyclically and in a gradual manner frequency-modulating the repetition rate of said transmitted pulses about said average frequency, and means for continuously maintaining said indicating means in synchronism with said transmitting means, thereby to reduce the effect of undesired reflected pulses from objects at ranges corresponding to time intervals greater than the time interval between transmitted pulses at said average frequency.

8. The method of determining the distance of remote objects relative to a predetermined point in space, comprising the steps of generating oscillations having a substantially constant frequency, transmitting an energy pulse once for each cycle of said oscillations, receiving energy pulses reflected from remote objects at time intervals corresponding to their distances, visually displaying each of said received pulses in space position as a function of their distance from said point, and continuously varying the phase position of the transmitted pulses with respect to the cycle of said oscillations in accordance with a double parabolic wave having a shape substantially corresponding to that of a doubly-integrated square wave, thereby to cause any reflecting object at a distance corresponding to a time interval less than a cycle of said oscillations to produce a sharp image over a relatively small area and to cause any reflecting objects exceeding said distance to produce illumination of substantially constant, lower intensity over a substantially greater area.

9. In a remote object detecting system, means to transmit recurrent energy pulses at a constant average repetition rate, means to receive said pulses as returned from remote objects, oscillographic means visually to display said received pulses in space position corresponding to the time of arrival thereof after the next preceding transmitted pulse, means continuously and cyclically to vary the repetition rate of said transmitted pulses in a gradual manner, means to maintain said oscillographic means continuously synchronized with said transmitted pulses during the variations in said repetition rate, thereby visually to display only pulses from remote objects within a predetermined distance from said system, and means to measure the time delay of said received pulses from a particular remote object, said last means being responsive to the average proportion of the interval between successive transmitted pulses occupied by the travel thereof to and from said object.

10. In combination, a source of voltage having an abrupt change in value at a predetermined instant of time, a source of voltage having a constant value with a voltage pulse superimposed thereon, an energy storage device, means to charge said device in one direction for a predetermined period of time before said abrupt change and at a rate determined by the total voltage of said sources, and means to charge said device in the opposite direction for a predetermined time after said abrupt change and at a rate determined by the total voltage of said first source and a reverse voltage of value equal to the voltage of said second source, thereby to produce a total charge on said storage device of value determined by the timing of said voltage pulse with respect to said predetermined instant of time.

11. In combination, a source of voltage producing a cyclic voltage wave with one constant value before a predetermined phase point in the cycle thereof and another constant value after said predetermined phase point, a source of voltage pulses of recurrence rate corresponding to the frequency of said cyclic voltage wave, an energy storage device, means to charge said device in one direction for a short period of time before said predetermined phase point in said cycle and at a rate determined by the total voltage of said sources, and means to charge said device in the opposite direction for a second short period of time at a rate determined by the sum of the voltage of said first source and a reverse voltage of value equal to the voltage of said second source, thereby to produce a charge on said device dependent on the relative phase position of said pulses with respect to said predetermined phase point.

12. In combination, a source of periodic voltage pulses having a point of neutral potential, two rectifiers in series connected across said source, said rectifiers being poled to conduct current when said pulses take place, a source of cyclic voltage of frequency equal to the frequency of said pulses and having an abrupt change in value at a predetermined phase point in the cycle thereof, a capacitor, means connecting said last source and said capacitor in series between said point of neutral potential and the common connection of said rectifiers, thereby to produce a charge on said capacitor determined by the phase position of said pulses with respect to said predetermined phase point.

13. In combination, a transmission line having one end short-circuited and the other end terminated in its characteristic impedance, means to apply an abrupt current change to the terminated end of said line, thereby to produce a voltage pulse at said terminated end due to reflection in said line, and means to delay said current change by a time interval corresponding to the electrical length of said line, an impedance terminating said last means, thereby to produce across said last impedance a voltage change having an edge bracketed in time by said voltage pulse produced by said transmission line.

14. In combination, a first transmission line having one end short-circuited and the other end terminated in its characteristic impedance, a second transmission line having an input end and an end terminated in its characteristic impedance, said second line having an electrical length substantially equal to the electrical length of said first line, means to apply an abrupt current change simultaneously to the terminated end of the first line and the input end of said second line, thereby to produce an abrupt voltage change across said last impedance bracketed in time by a voltage pulse produced by said current change at the terminated end of said first line.

15. In locating equipment of the type wherein recurrent energy pulses are transmitted and distances to remote objects are determined from the time intervals required for corresponding pulses to return therefrom, a recurrent wave generator for determining the average recurrence rate of pulse transmission, a delay multivibrator synchronized by said generator for generating recurrent triggering pulses of controllable width, a pulse transmitter synchronized by said multivibrator for transmitting said energy pulses in synchronism with the trailing edges of said triggering pulses, a second generator of periodic waves of predetermined wave form and relatively low recurrence rate, means for continuously and cyclically width-modulating said multivibrator in response to said periodic waves, thereby to produce a corresponding modulation in said triggering pulse widths and in said rate of pulse transmission, and means synchronized with the pulses from said transmitter for receiving and indicating said corresponding returned pulses as a function of said time intervals, thus to avoid false measurements due to objects more remote from said equipment than the distance corresponding to the time interval between successive transmitted pulses.

16. In a system for measuring and indicating the average width of recurrent electrical pulses, means for developing a unidirectional control potential proportional to the average width of said pulses, an adjustable source of unidirectional reference potential, a source of alternating reference voltage of predetermined frequency, means for producing an alternating error voltage of the same frequency whose amplitude and polarity with respect to said reference voltage are controlled respectively by the sign and magnitude of the potential difference between said unidirectional potentials, a directional motor controlled by said error voltage for adjusting said reference potential in a sense to decrease said potential difference, and an indicating means controlled by said motor.

17. In a system for remotely indicating the average width of recurrent electrical pulses, means for developing a unidirectional control potential proportional to the average width of said pulses, means comprising a potentiometer having a movable contact arm for developing an adjustable unidirectional reference potential, a source of alternating reference voltage of predetermined frequency, means for producing an alternating error voltage of the same frequency whose amplitude and polarity with respect to said reference voltage are controlled respectively by the sign and magnitude of the potential difference between said unidirectional potentials, an alternating current motor energized from said voltages, the direction and extent of rotation of the motor rotor being dependent on the amplitude and polarity of said error voltage, means controlled by said rotor for adjusting the position of said contact arm in a sense to decrease said potential difference, and a remote indicating means controlled by said rotor for indicating the position of said arm on said potentiometer.

18. In locating equipment of the type wherein recurrent energy pulses are transmitted and the positions of remote objects are determined from the time intervals required for corresponding pulses to return therefrom, a pulse transmitter, control means generating synchronizing pulses at constant rate, a variable time delay means interposed between said control means and said transmitter, means for continuously and cyclically varying said delay means in a predetermined manner to modulate the frequency of pulse transmission, and means synchronized with the pulses from said transmitter for receiving and indicating said corresponding returned pulses as a function of said time intervals, thereby to avoid false indications due to pulses returned from objects more remote from said equipment than the distance corresponding to said time intervals.

19. In pulse echo locating equipment, means for transmitting a train of pulses of wave energy, means for receiving echoes of said pulses from remote objects, an oscillographic display device including sweep circuit means and arranged to produce a range indication coordinate controlled by said circuit means, means for producing a train of trigger pulses each said pulse synchronized with a corresponding transmitted pulse, a pulse generator controlled by said trigger pulses and connected to energize said sweep circuit means with a single range sweep pulse of predetermined waveform in response to each applied trigger pulse, means for supplying each of said echo pulses to said device to produce an indication on said coordinate and at a space position dependent upon the elapsed time between said echo pulse and its corresponding transmitted pulse, and means for smoothly and cyclically varying the repetition rate of said transmitted pulses, whereby indications of echoes received prior to the transmission of a succeeding transmitted pulse tend to be superimposed while indications of later echoes tend to be scattered.

20. Apparatus for determining the distance of remote objects from a predetermined point in space, comprising means for transmitting successive energy pulses, means for receiving corresponding energy pulses from said remote objects, means for visually indicating each of said received pulses in space position corresponding to the time of arrival thereof after the corresponding transmitted pulses, and electronic means for smoothly and cyclically varying the repetition rate of said transmitted pulses in a predetermined manner to minimize the effect of interfering received pulses.

DONALD E. NORGAARD.

REFERENCES CITED

The following references are of record in the file of this patent:

UNITED STATES PATENTS

| Number | Name | Date |
|---|---|---|
| 1,979,225 | Hart | Oct. 30, 1934 |
| 2,189,549 | Hershberger | Feb. 6, 1940 |
| 2,227,598 | Lyman et al. | Jan. 7, 1941 |
| 2,266,401 | Reeves | Dec. 16, 1941 |
| 2,308,752 | Hadfield | Jan. 19, 1943 |
| 2,309,525 | Mohr | Jan. 26, 1943 |
| 2,328,944 | Beatty | Sept. 7, 1943 |
| 2,408,692 | Shore | Oct. 1, 1946 |
| 2,415,095 | Varian | Feb. 4, 1947 |
| 2,419,292 | Shepard | Apr. 22, 1947 |
| 2,419,541 | De Rosa | Apr. 29, 1947 |
| 2,425,600 | Coykendall | Aug. 12, 1947 |
| 2,433,343 | Chatterjea | Dec. 30, 1947 |
| 2,444,452 | Labin | July 6, 1948 |
| 2,448,016 | Busignies | Aug. 31, 1948 |
| 2,452,598 | Page | Nov. 2, 1948 |
| 2,485,583 | Ginzton | Oct. 25, 1949 |